April 21, 1925.　　　　C. E. JUDD　　　　1,534,963
RENEWABLE BEARING
Filed May 17, 1924　　　2 Sheets-Sheet 1
Fig. 1.
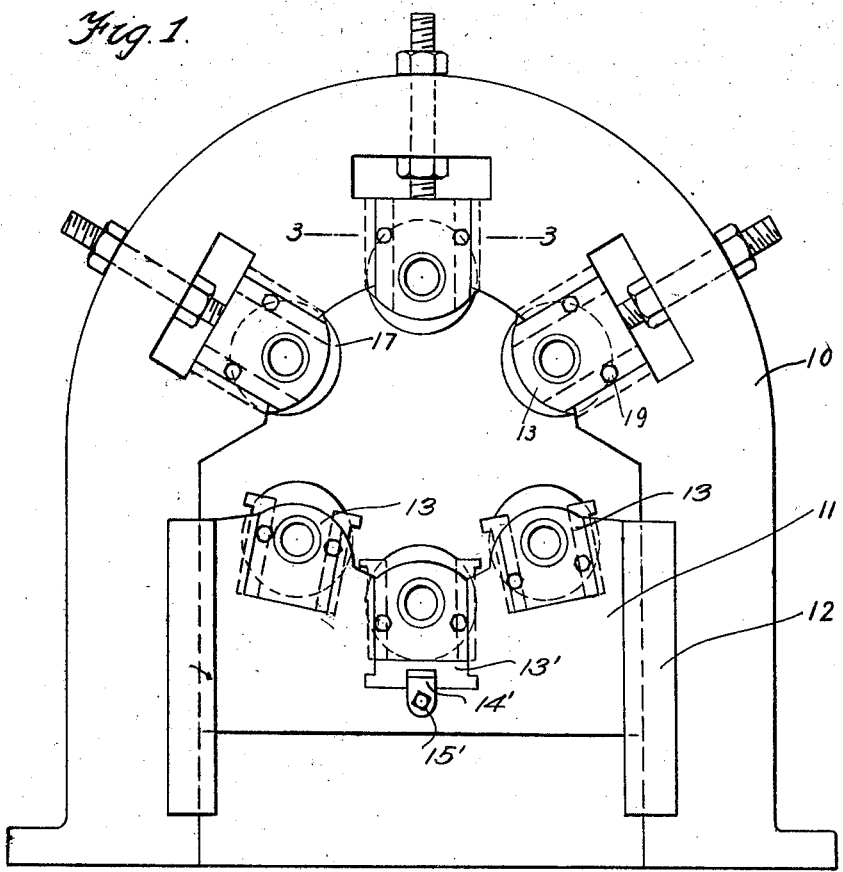
Fig. 11.
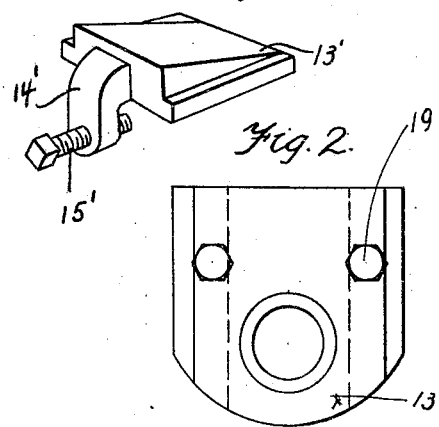
Fig. 3.
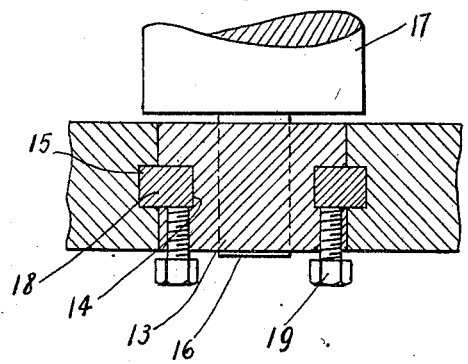
Fig. 2.
C. E. Judd
INVENTOR
BY Victor J. Evans
ATTORNEY April 21, 1925.

C. E. JUDD 1,534,963

RENEWABLE BEARING

Filed May 17, 1924  2 Sheets-Sheet 2

C. E. Judd.
INVENTOR
BY Victor J. Evans
ATTORNEY

Patented Apr. 21, 1925.

1,534,963

UNITED STATES PATENT OFFICE.

CARROLL E. JUDD, OF ZANESVILLE, OHIO.

RENEWABLE BEARING.

Application filed May 17, 1924. Serial No. 714,115.

*To all whom it may concern:*

Be it known that I, CARROLL E. JUDD, a citizen of the United States, residing at Zanesville, in the county of Muskingum and State of Ohio, have invented new and useful Improvements in Renewable Bearings, of which the following is a specification.

This invention relates to removable shaft bearings, primarily designed for use on metal rolling machines, to permit any one of the bearings to be singly removed and replaced by a new bearing as the occasion may require, without disassembling the machine which is now necessary by reason of the bearing constructions, although the general application of the invention is contemplated by the claim.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is an end elevation of a rolling machine showing the arrangement of the bearings thereon.

Figure 2 is a view in elevation of one type of bearing.

Figure 3 is a sectional view taken on the line 3—3 of Figure 1.

Figure 11 is a detail view of the adjusting wedge.

Figure 4:
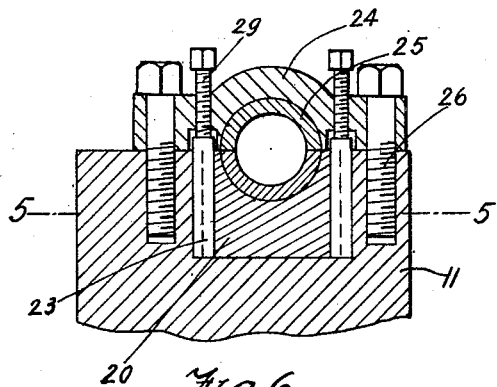
Figure 4 is a fragmentary sectional view through another type of bearing.
Figure 5:
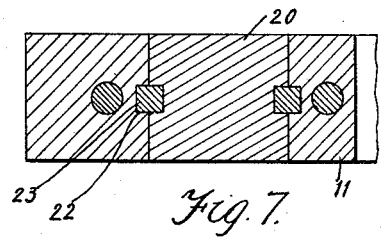
Figure 5 is a sectional view taken on the line 5—5 of Figure 4.
Figure 6:
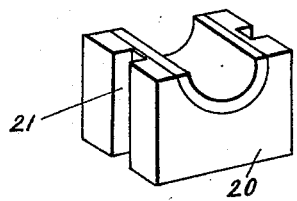
Figure 6 is a perspective view of the lower part of the bearing such as shown in Figure 4.
Figure 7:
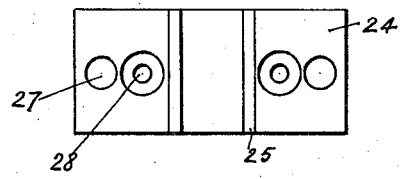
Figure 7 is a bottom plan view of the upper part of the bearing shown in Figure 4.

Referring to the drawings in detail, 10 represents the frame of the machine or other support with which the bearings are adapted to be associated, while 11 illustrates a movable head forming part of the particular type of machine herein shown, and which head supports a plurality of shaft bearings as shown in Figure 1. This head is formed with guides 12 which slide upon the frame 10, both the frame 10 and the head 11 are formed with recesses to accommodate the bearings, and as shown in Figure 1 there are three of these bearings shown as being supported upon the frame 10 of the machine, and three bearings carried by the head 11. The bearings thus supported consist of a bearing block 13, the opposed sides of which are formed with key ways 14 which are adapted to open into and communicate with similar key ways 15 formed in the opposed sides of the recesses provided for the bearing blocks 13. Each bearing block is adapted to receive the shaft 16 of a roller 17, the bearing block being held in position on the frame 10 by means of a key 18 adapted to be partly received by the adjacent key ways 14 and 15 above referred to. In the particular type of bearing referred to, the bearing block supported on the frame 10 carry threaded adjusting elements 19 which project from the face of the bearings so that they can be conveniently manipulated, these elements when tightened serving to hold the keys 18 immovable in their operative positions. By reason of this construction, any one of the bearings carried by the frame 10 can be quickly removed and replaced by a new bearing when desired without interfering with any other bearing or any part of the machine, as it is only necessary to loosen the adjusting elements 19 to permit the keys 18 to be slid endwise out of their key ways, after which the bearing block 13 can be moved endwise out of the frame 10 and off the shaft 16. The bearings carried by the head 11 are also susceptible of adjustment within their respective recesses, and for this purpose each bearing block 13 reposes upon an adjustable wedge shaped element 13' shown in Figure 11. The head 11 is provided with an opening for each block 13', while projecting from one end of the block is a downturned apertured arm 14' which supports an adjusting screw 15'. Manifestly by adjusting the screw 15', the wedge 13' can be moved in the direction of the head, which of course adjusts the particular bearing block 13 which reposes upon the block 13'.

In Figures 4 to 7 inclusive, I have illustrated in detail a different form of bearing. In this form of the invention, the bearing is made up of two parts, namely a lower part or block 20, which has its opposed sides formed with key ways 21 which are adapted to open into similar key ways 22 formed in the opposed sides of the recesses provided to receive the lower part 20 of the bearing. Keys 23 are then partly fitted in each of the adjacent keyways just referred to, these keys projecting a slight distance above the upper surface of the bearing 20, so that they can be conveniently taken hold of and removed when desired. The upper part of the bearing is in the form of a cap indicated at 24, shaped to partly embrace the shaft 25, and which cap is held operatively associated with the lower part of the bearings by means of fastening bolts 26 which pass through the openings 27 in the cap and are adapted to be threaded into openings formed in the head or support 11. The underside of this cap 24 is provided with pockets 28 to receive the projecting upper extremities of the keys 23 when the cap is placed in position upon the lower part 20 of the bearing. Carried by the cap are adjusting elements 29 which pass through the pockets 27, and arranged in axial alignment with the keys 23 when the cap is arranged upon the lower part 20 of the bearing. These elements 29 can be tightened against the keys 23, and are of course utilized to hold the keys immovably positioned in their respective key ways.

Figure 9:
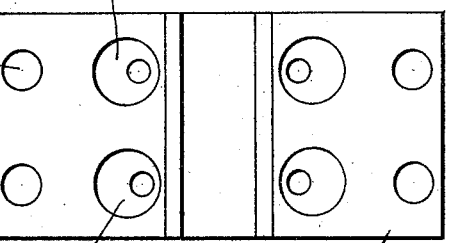
Figure 9 is a bottom plan view of the upper part of the bearing shown in Figure 8.
Figure 8:
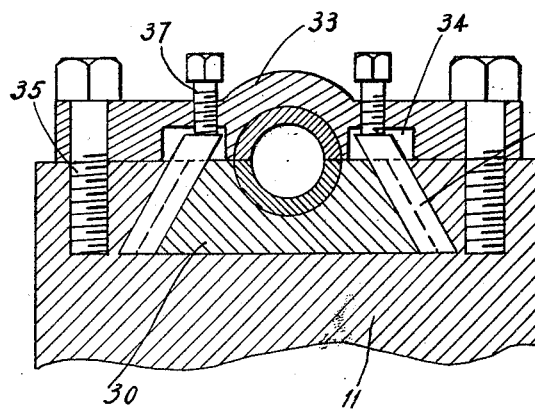
Figure 8 is a view similar to Figure 6 of another form of bearing.
Figure 10:
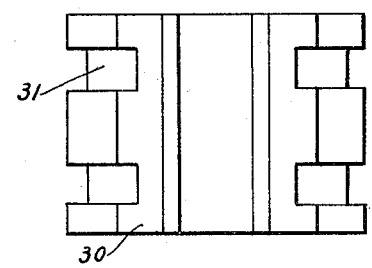
Figure 10 is a plan view of the lower part of the bearing shown in Figure 8.

In Figures 8 to 10 inclusive I have shown another form of the invention wherein the lower part 30 on the bearing is substantially dove tailed, the recess formed in the support 11 being of similar contour to accommodate this part of the bearing.

The opposed sides of the bearing 30 is formed with inclined key ways 31 which open into similar key ways formed in the support 11, to accommodate keys 32 utilized to hold the lower part 30 of the bearing immovably associated with its support 11. As in the form shown in Figure 4, these keys 32 project a slight distance above the upper surface of the support and bearing 30, so that they can be conveniently taken hold of and removed when the keys may require, the upper part of the cap 33 of the bearing having its underside formed with recesses or pockets 34 to receive the adjacent ends of the key 32, when the cap is arranged to repose upon the support 11. The cap 33 is held in position by means of fastening bolts 35 adapted to pass through openings 36 and threaded into the support 11. Carried by this cap 33 are adjusting elements 37 which are adapted to be tightened against the adjacent ends of the keys 32 to hold the keys in place. As hereinabove stated, the bearing is primarily intended for use with machines of the character illustrated, but can be used wherever their use will be found advantageous, and that the term support used in the claim is intended to refer to any character of support with which the bearing may be associated.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

Having thus described the invention, I claim:

In combination with a support having keyways, of a two part removable bearing, one part being fitted into the support and having keyways opening into the keyways of the support, keys partly fitted in each of the adjacent keyways, a cap constituting the other part of the bearing and adapted to repose upon the support, said keys having corresponding extremities projecting beyond the support for the purpose specified, the underside of said cap having pockets to receive the projecting extremities of said keys, and adjusting elements carried by the cap and adapted to pass through said pockets to engage and hold said keys in position for use.

In testimony whereof I affix my signature.

CARROLL E. JUDD.